(12) United States Patent
Michishita et al.

(10) Patent No.: US 12,000,011 B2
(45) Date of Patent: Jun. 4, 2024

(54) SYSTEM AND METHOD FOR THE PRODUCTION OF HOT BRIQUETTED IRON (HBI) CONTAINING FLUX AND/OR CARBONACEOUS MATERIAL AT A DIRECT REDUCTION PLANT

(71) Applicant: Midrex Technologies, Inc., Charlotte, NC (US)

(72) Inventors: Haruyasu Michishita, Charlotte, NC (US); Taiji Hatakeyama, Charlotte, NC (US); Todd Astoria, Harrisburg, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 17/843,013

(22) Filed: Jun. 17, 2022

(65) Prior Publication Data

US 2022/0403481 A1  Dec. 22, 2022

Related U.S. Application Data

(60) Provisional application No. 63/213,307, filed on Jun. 22, 2021.

(51) Int. Cl.
*C22B 1/24* (2006.01)
*C21B 3/02* (2006.01)
(Continued)

(52) U.S. Cl.
CPC ............... *C22B 1/24* (2013.01); *C21B 3/02* (2013.01); *C21B 13/008* (2013.01);
(Continued)

(58) Field of Classification Search
CPC .. B30B 11/00; C22B 1/00; C21B 3/00; C21B 3/02; C21B 13/00; C21B 13/008; C21B 13/0086; F27D 3/00; F27D 3/08
See application file for complete search history.

(56) References Cited

U.S. PATENT DOCUMENTS 6,352,573 B2   3/2002   Mcclelland, Jr. et al.
8,685,136 B2   4/2014   Metius et al.
(Continued)

FOREIGN PATENT DOCUMENTS

IN    201921038999 A    4/2021

OTHER PUBLICATIONS

Sep. 16, 2022 International Search Report issued in Corresponding International Application No. PCT/US22/34129.

*Primary Examiner* — Vanessa T. Luk
*Assistant Examiner* — Nikolas Takuya Pullen
(74) *Attorney, Agent, or Firm* — Clements Bernard Walker; Christopher L. Bernard

(57) ABSTRACT

A process for producing hot briquetted iron with increased solid carbonaceous material and/or flux includes: providing a shaft furnace of a direct reduction plant to reduce iron oxide with reducing gas; providing a hot briquette machine to produce hot briquetted iron; coupling a chute between a) a discharge exit of the shaft furnace for discharge of hot direct reduced iron and b) an entrance of the hot briquette machine; adding solid carbonaceous material and/or flux to the discharged hot direct reduced iron from the shaft furnace to produce a mixture of the discharged hot direct reduced iron and the solid carbonaceous material and/or flux before feeding to the hot briquette machine; and processing in the hot briquette machine to produce a product of hot briquetted (Continued)

iron with increased solid carbonaceous material content greater than about 3 weight percent and/or an increased flux content.

31 Claims, 6 Drawing Sheets

(51) Int. Cl.
- *C21B 13/00* (2006.01)
- *C21B 13/02* (2006.01)
- *C22B 1/243* (2006.01)
- *C22B 1/244* (2006.01)
- *F27B 1/00* (2006.01)
- *F27D 3/08* (2006.01)
- *F27D 13/00* (2006.01)

(52) U.S. Cl.
CPC .......... *C21B 13/0086* (2013.01); *C21B 13/02* (2013.01); *C22B 1/243* (2013.01); *C22B 1/244* (2013.01); *F27B 1/00* (2013.01); *F27D 3/08* (2013.01); *F27D 13/00* (2013.01)

(56) References Cited

U.S. PATENT DOCUMENTS

| | | | |
|---|---|---|---|
| 10,508,314 | B2 | 12/2019 | Motamedhashemi |
| 2001/0047698 | A1* | 12/2001 | McClelland, Jr. ...... C22B 1/248 75/436 |
| 2005/0151307 | A1 | 7/2005 | Viramontes-Brown et al. |
| 2008/0236335 | A1* | 10/2008 | Metius .................. C21B 13/143 266/195 |
| 2010/0068088 | A1 | 3/2010 | Tanaka et al. |
| 2013/0081516 | A1 | 4/2013 | Simmons |
| 2013/0174695 | A1* | 7/2013 | Heckmann .............. C10L 5/361 75/771 |
| 2017/0058373 | A1 | 3/2017 | Motamedhashemi |
| 2018/0119237 | A1 | 5/2018 | Voelker et al. |
| 2020/0385827 | A1 | 12/2020 | Astoria et al. |
| 2021/0238707 | A1* | 8/2021 | Park ........................ C22B 1/248 |
| 2021/0301358 | A1 | 9/2021 | Bastow-cox et al. |
| 2021/0301359 | A1 | 9/2021 | Astoria et al. |
| 2021/0301360 | A1 | 9/2021 | Astoria et al. |

* cited by examiner

SYSTEM AND METHOD FOR THE PRODUCTION OF HOT BRIQUETTED IRON (HBI) CONTAINING FLUX AND/OR CARBONACEOUS MATERIAL AT A DIRECT REDUCTION PLANT

CROSS-REFERENCE TO RELATED APPLICATION

The present non-provisional patent application claims the benefit of priority of U.S. Provisional Patent Application No. 63/213,307, filed on Jun. 22, 2021, and entitled "PRODUCTION OF DRI CONTAINING FLUX AND/OR CARBONACEOUS MATERIAL AT A DIRECT REDUCTION PLANT," the contents of which are incorporated in full by reference herein.

TECHNICAL FIELD

The present disclosure relates generally to the direct reduced iron (DRI) and steelmaking fields. More specifically, the present disclosure relates to a method and system to produce the agglomeration of hot direct reduced iron (HDRI), namely hot briquetted iron (HBI) containing solid carbonaceous material and/or flux to preferably be used as feedstock for a downstream direct reduced iron (DRI) melting process.

BACKGROUND

HDRI/HBI is the common feedstock for the electric iron melter such as an electric arc furnace (EAF) as a clean iron unit. In the case of melting high grade HDRI/HBI made from oxide having a high iron content (Fe>67 wt. %), the HDRI/HBI can be fed to the melter to produce liquid steel, where higher amount of flux must be added together with HDRI/HBI to achieve the target slag basicity C/S (CaO to SiO2 weight % ratio)>2.

In the case of melting the low grade HDRI/HBI made from oxide having a lower iron content (Fe<65 wt. %) and higher amount of acid gangue, to reduce the operating and capital cost in melting HDRI/HBI to produce liquid steel, 2 step processes can be applied as practiced at BF integrated steel mills. At the first melting step the carbon content typically C>3% in the hot metal and the slag basicity C(Calcium)/S(Silica)=1.1~1.3 will be the target in melting HDRI/HBI and removing the slag, followed by the second melting step where the carbon in the hot metal is decarburized with the oxygen blowing to produce the liquid steel. Then, higher amount of carbon and flux must be added together with HDRI/HBI to achieve the target carbon content in the hot metal and slag basicity at the first melting step.

In either above case, the amount of carbon and flux in the conventional HDRI/HBI is not high enough to achieve these target values at the DRI melting process. Solid carbonaceous material and flux are usually added together with HDRI/HBI, but the addition of the loose solid carbonaceous material and flux yield a higher loss due to the entrainment in the slag or offgas discharged from the melter, which significantly increases the operating cost.

BRIEF SUMMARY OF THE INVENTION

The present disclosure provides a method and system to produce HBI mixed with solid carbonaceous material and/or flux to preferably be used as feedstock for a downstream DRI melting process, among other uses. An overall benefit is to enable the HBI to contain the desired amount of carbon and/or flux required for the downstream melting process, so that it can improve the yield of carbon and/or flux by eliminating or reducing the amount of external carbon and/or flux addition at the melter. A further benefit of embodiments is the ability to add by the herein disclosed methods and systems, solid carbonaceous material and/or flux after reduction, and between the shaft furnace and hot briquette machine.

Thus, disclosed herein are systems and methods wherein, advantageously, solid carbonaceous and/or flux material are added to the HDRI between discharging from the shaft furnace and charging to a hot briquette (HB) machine to produce the HBI for the external off-taker, or the downstream melter to produce liquid steel or hot metal.

Embodiments of the herein disclosed systems and methods enable the production of HDRI agglomerate or HBI containing enough amount of carbon and/or flux required for the downstream melting process; either the liquid steel production (single step process) or the hot metal production (2 step processes). The product can be HDRI agglomerate not necessarily with higher density and strength or just strong enough to be transferred to, e.g., an adjacent melting facility without generating significant fines, in the case where the HDRI may be used at a melting facility near the DR plant. The product can desirably be HBI with a density and strength specified by any applicable ocean shipment regulations, in the case of the HBI being shipped to the external off-takers, according to embodiments.

To further illustrate advantages of the present disclosure, it is further noted that in an effort to produce liquid steel using the low grade HDRI/HBI, as an alternative, two (2) step processes can be applied as practiced at blast furnace (BF) integrated steel mills. In the first step, the hot metal with the higher carbon and lower slag basicity is produced to melt the HDRI/HBI and remove the slag. In the second step, the carbon in the hot metal is decarburized with blowing oxygen to produce the liquid steel. However, such two (2) step processes with conventional HDRI/HBI have at least the following issues in producing the hot metal in the first melting step.

1. The carbon amount in conventional HDRI/HBI (C about 1-1.5wt. %) is not high enough to reduce the remaining FeO in HDRI/HBI and maintain the carbon in the hot metal (preferably C>3-4 wt. %) to maintain the low FeO in the slag;
2. Basic gangue content in the conventional HDRI/HBI is not high enough to maintain the slag basicity suitable for the hot metal production (preferably C/S=1.1~1.3); and
3. Charging the carbonaceous material, such as coke breeze, and flux material, such as lime and dolomite, in parallel to charging the HDRI/HBI during the first melting step (i.e., external addition), can lead to high losses of additives due to their entrainment in offgas and slag.

Accordingly, what is needed in the art, and addressed by the present disclosure, is a system and method allowing the HDRI/HBI to contain enough amount of carbon and/or flux (>3 wt. % C, preferably C>4 wt. %), so that the low grade HDRI/HBI can be melted efficiently with the minimum yield loss of carbon and/or flux to produce the hot metal in the first melting step. It will be appreciated that the flux content can vary based on operating condition, more specifically the amount of acid gangue in the iron oxide and the target slag basicity (C/S=1.1~1.3) at the first melting step to produce the hot metal. In this regard and according to embodiments of the present invention, the carbonaceous material content in the produced hot briquetted iron may be increased to greater than about 3 weight percent and/or the flux content increased. The increased flux content can be determined by the target slag basicity suitable for the hot metal production such as greater than 1.0 according to embodiments.

Moreover, in the case of the single melting step process to produce liquid steel with the high grade HDRI/HBI, a large amount of additional flux must be externally charged to achieve the higher slag basicity (C/S>2.0) suitable for steel production. Thus, what is also needed in the art, and also addressed by the present disclosure, is a system and method allowing, e.g., the high grade HDRI/HBI to contain enough amount of the carbon and/or flux, instead of adding externally at a melting facility, to minimize the yield loss.

It is further noted that DRI can be carburized with natural gas or CO gas injected into a DR shaft furnace. However, too much natural gas injection cools the burden in the shaft furnace, which negatively affects the reduction performance. Moreover, the carburizing performance is affected by the carburizing kinetic and chemical equilibrium under the presence of various compounds such as $CO_2$ and $H_2O$ in the shaft furnace. Accordingly, all the carbon in the injected gas does not contribute to the carburization of the DRI. It eventually contributes to the reduction of the iron oxide, but it is not preferred from a thermal efficiency point of view. Also, as more carburizing gas passes through the carburization zone to get to the reduction zone located above in the shaft furnace, the required amount of carburizing gas increases.

To achieve the carbon free steelmaking with a $H_2$ based DR plant, the carburizing gas should be derived from a green carbon source. Biogas such as the product gas from biological fermentation or digestion can be the gas, but the availability is limited. Also, $CO_2$, $H_2O$ and $H_2S$ need to be removed before introducing the gas to the shaft furnace. In another option, the renewable carbonaceous material (biomass) can be gasified with a pyrolytic process, but this requires significant capital investment.

Thus, instead of using green carburizing gas, one can consider adding a solid biomass or biochar in the oxide iron feedstock for the DR plant because the carbon should remain during the reduction process. However, the oxide feedstock for the DR plant is mostly the indurated pellet. Accordingly, the carbonaceous material is burned out during the induration when the solid carbonaceous material is added before induration.

Also, flux can be added before the induration process as "fluxed pellet" which can also be applied for a blast furnace (BF). However, the amount of the flux in the oxide pellet has some restriction because the higher gangue basicity with more flux addition deteriorates the strength of the indurated pellet. For instance, the indurated pellet having much lime generates a lot of fines when it is stored on the open yard under a lot of rain. Therefore, the amount of flux in the "fluxed pellet" is less than the amount desired at, e.g., a melting facility and a significant amount of flux must be externally added at the melter even with the HDRI/HBI made from the "fluxed pellet".

Furthermore, the productivity for the direct reduced iron or the iron content of the DRI produced by the shaft furnace decreases as more carbon and/or flux is added in the feedstock of the shaft furnace. Therefore, it is desired to add the solid carbon and/or flux material to HDRI/HBI in a homogeneous manner at the DR plant, preferably after completion of the reduction process, but no such technologies are believed currently available as herein presented by the present disclosure.

Accordingly, embodiments of the herein disclosed systems and methods advantageously address the foregoing needs and others.

In an illustrative embodiment, a process for producing hot briquetted iron with increased solid carbonaceous material and/or flux comprises: providing a shaft furnace of a direct reduction plant to reduce iron oxide with reducing gas; providing a hot briquette machine to produce hot briquetted iron; coupling a chute between a) a discharge exit of the shaft furnace for discharge of hot direct reduced iron and b) an entrance of the hot briquette machine; adding solid carbonaceous material and/or flux to the discharged hot direct reduced iron from the shaft furnace to produce a mixture of the discharged hot direct reduced iron and the solid carbonaceous material and/or flux before feeding to the hot briquette machine; and processing in the hot briquette machine to produce a product of hot briquetted iron with increased solid carbonaceous material content of greater than 3 weight percent and/or an increased flux content.

In another illustrated embodiment, a system for producing hot briquetted iron with increased solid carbonaceous material and/or flux comprises: a shaft furnace of a direct reduction plant configured to reduce iron oxide with reducing gas; a hot briquette machine configured to produce hot briquetted iron; a chute coupled between a) a discharge exit of the shaft furnace for discharge of hot direct reduced iron and b) an entrance of the hot briquette machine; and solid carbonaceous material and/or flux configured to be added to the discharged hot direct reduced iron from the shaft furnace to produce a mixture of the discharged hot direct reduced iron and the solid carbonaceous material and/or flux before feeding to the hot briquette machine. The mixture is configured to be processed in the hot briquette machine to produce a product of hot briquetted iron with increased solid carbonaceous material content of greater than 3 weight percent and/or an increased flux content.

BRIEF DESCRIPTION OF THE DRAWINGS

The present disclosure is illustrated and described herein with reference to the various drawings, in which like numbers are used to denote like method steps/system/apparatus components, as appropriate, and in which.

DETAILED DESCRIPTION

Again, in various embodiments, the present disclosure relates generally to DRI and steelmaking fields. More specifically, the present disclosure relates to a method and system to produce HBI mixed with the solid carbonaceous material and/or flux to preferably be feedstock for the downstream DRI melting process. An overall benefit is to enable the HBI to contain the desired amount of carbon and/or flux required, e.g., for a downstream melting process, so that it can improve the yield of carbon and/or flux by eliminating or reducing the amount of external carbon and/or flux addition at the melter.

Figure 1:
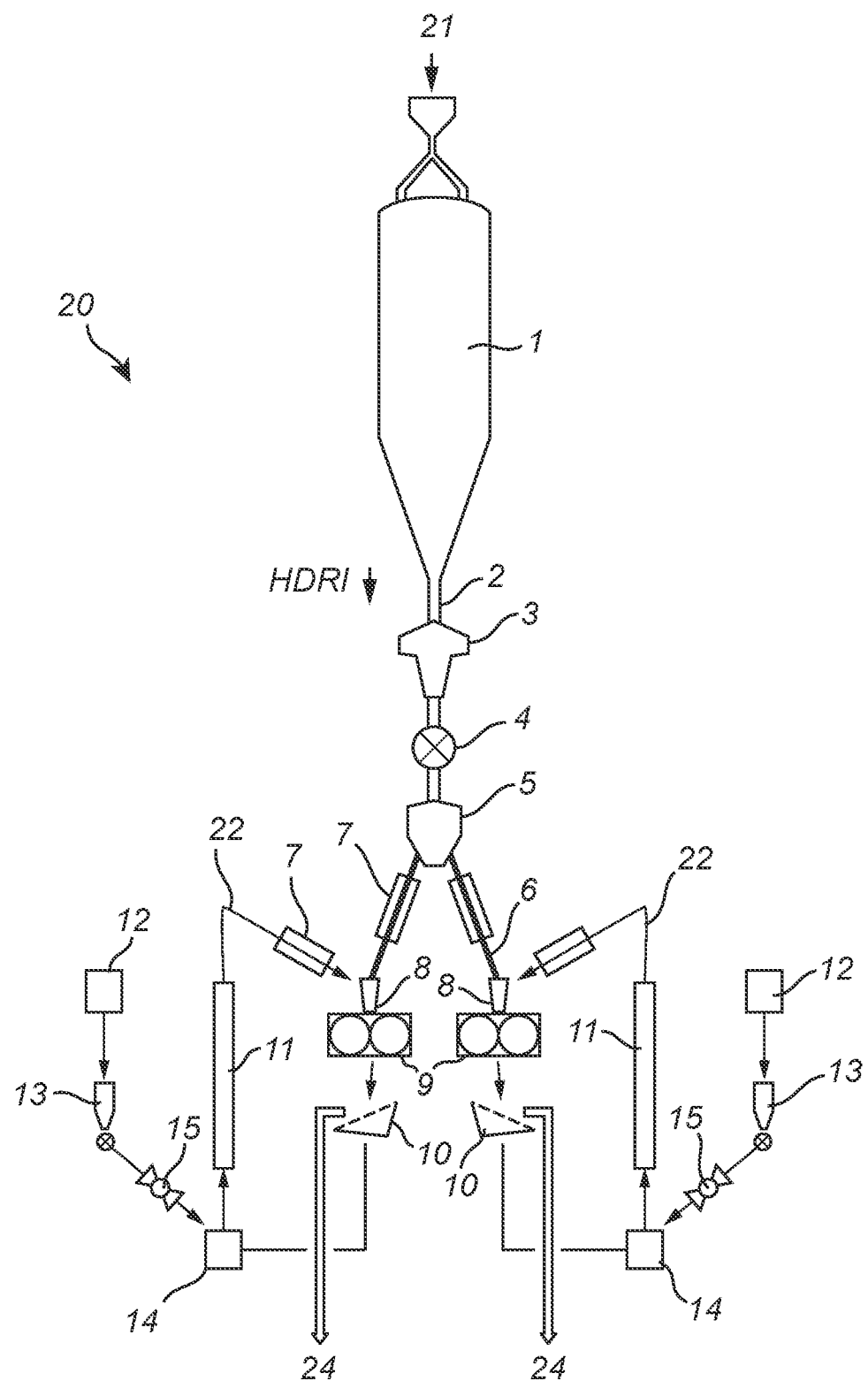
FIG. 1 is a schematic diagram illustrating an embodiment of the novel system and method of adding carbon and/or flux at a HBI fines recycle system, where carbon and/or flux are mixed with HBI fines to be recycled to a HB machine, according to the present disclosure.

Referring now specifically to FIG. 1, which shows a schematic diagram for process/system 20 of the present disclosure in one exemplary embodiment, carbon and flux are fed into a carbon/flux mixer 14 located in a HBI fines recycle system 22, where the carbon and/or flux are mixed with HBI fines to be recycled to a HB machine 9 via HB fines recycle conveyor 11.

It is noted that carbon as referenced herein can include a solid, carbonaceous material such as coke breeze, coal, biochar and so forth, and flux as referenced herein can include lime, dolomite, and so forth, as readily understood in the art.

As illustrated in FIG. 1, iron oxide 21, typically in pellet form, is fed from the top of direct reduction shaft furnace 1 and HDRI is discharged from the bottom at a discharge exit and through a chute or shaft furnace lower seal leg 2 which can seal shaft furnace 1. The HDRI is transferred to the HB machine 9 through product discharge chamber (PDC) 3, hot product distributor or divertor (HPD) 5, briquette feed leg 6 and briquette feed screw 8.

The PDC 3 can advantageously screen out undesired, large chunks, which could damage the HB machine 9, with use of a suitable mesh or other screening device.

The HPD 5 distributes the HDRI to each briquette feed leg 6 which transfers HDRI to the briquette feed screw 8 for each HB machine 9. In this regard, while two HB machines 9, two briquette feed screws 8 and two briquette feed legs 6 are shown in FIG. 1, any suitable, desired number may be employed as needed for, e.g., production, space constraints and so forth. The briquette feed screw 8 mixes and pushes HDRI discharged from shaft furnace 1 and HBI fines recycled from HBI fines recycle system 22 into the HB machine 9. HB machine 9 presses the feed material mixture with, e.g., two rollers, to produce typically pillow shaped HDRI agglomerates of HBI. The product of the HB machine 9 is then processed with a hot briquette screen 10, and thereafter, e.g., any oversize HBI product 24 can be cooled and then shipped to, e.g., the off-taker or fed to a melter while undersize fines are recycled to the HB machine 9 through the HBI fines recycle system 22 comprising the carbon/flux mixer 14 and a hot briquette fines recycle conveyor 11.

In the embodiment of FIG. 1, the carbon and/or flux are mixed with HBI fines in the carbon/flux mixer 14 via carbon/flux feed system 13 and then fed back to the briquette feed screw 8 to produce the HBI containing the carbon and/or flux. The carbon/flux mixer 14 can be, e.g., a simple mixing chamber or a mixer equipped with a mechanical mixing device such as one or more agitators or paddles.

With the carbon and/or flux addition to HDRI, the mechanical strength of the HBI would be expected to be lowered, which could be a concern in the case where the HBI is shipped to an external off-taker. The ductile metallic iron in the HBI is compressed and bonded together when the HB machine 9 compacts the HDRI at higher temperature (typically >650° C.), which is a mechanism to advantageously maintain the strength of the HBI. Less metallic iron or more foreign substances such as iron oxide, gangue and carbon in the HBI decreases the strength of the HBI.

Therefore, HBI having lower metallization, lower iron or higher gangue content generally brings the lower strength. In principle, higher HBI strength can be achieved to increase the contact area of the metallic iron, but cannot be achieved as the metallic iron contact is hindered to increase the contact area between the metallic iron and the carbon/flux in the HBI because the carbon/flux acts as the separating agents and reduces the strength of HBI.

Accordingly, to improve the strength of the HBI, it has also been herein determined that it is advantageous to increase the fines fraction of HDRI or decrease the fines fraction of carbon and flux. More specifically, according to embodiments, through testing it has been found that the fraction of less than 6 mm HDRI fines should be >5 wt. %, more preferably >10 wt. %. Also, the fraction of less than 200 mm kmicron) carbon and/or flux fines should be <20 wt. %, more preferably <10 wt. %. Therefore, as an option, the fines fraction of HDRI, carbon and/or flux can be adjusted before being mixed and compressed at the HB machine 9 to improve the strength of HBI.

As also shown in FIG. 1, in one exemplary embodiment, a HDRI crusher 4 can be optionally applied between the PDC 3 and HPD 5 to crush all or some of the HDRI to increase the fines fraction of HDRI, but in principle the location of the HDRI crusher 4 could also be anywhere between shaft furnace 1 and HB machine 9 as desired. Crusher 4, comprising any suitable conventional crushing machine such as impact crusher or hammer mill, can be employed to adjust the size of the fines to the desired small particle size.

Thus, to improve HBI strength, the fines fraction of carbon and/or flux can be optionally adjusted with pre-agglomeration for carbon and/or flux using water and and/or a suitable binder in the carbon/flux preparation system 12 in FIG. 1. Suitable binders include, but are not limited to, organic binders in general, starch, molasses and so forth.

As further shown in FIG. 1, the carbon and/or flux are preliminarily prepared in a carbon/flux preparation system 12. Carbon and flux could be pre-mixed as desired when both carbon and flux are added to the HDRI. The prepared carbon and/or flux material is transferred to carbon/flux bin and feed system 13, where the carbon and/or flux material is stored in the bin and a controlled amount of the material is discharged from the bin with the feeder in accordance with the desired target mixing rate with HDRI. The feed rate of carbon and/or flux can be linearly adjusted with the HDRI production rate from shaft furnace 1 or the HBI production rate from the HB machine 9 estimated by, e.g., the roller speed and the measured HBI density or the direct weight measurement of the HBI produced.

The temperature of the mixture fed to the HB machine 9 should be maintained at, e.g., >650° C. to achieve desired, acceptable density and strength of the HBI because HBI of undesired low density and strength can cause issues during the transportation and storage, especially in the case of the HBI being shipped to external off-takers.

As further shown in FIG. 1, the mixed material fed to briquette feed screw 8 for each HB machine 9 can be optionally preheated with briquette feed leg preheater 7, which can be an electric induction or resistance heater, to make up any temperature drop resulting from adding any cold carbon and/or flux. Briquette feed leg preheater 7 can be optionally installed for the recycled HBI fines after adding carbon and/or flux and/or HDRI fed through briquette feed leg 6. As another alternative, only carbon and/or flux can be optionally preheated in carbon/flux preparation system 12.

Additionally, the HDRI may also be optionally cooled as desired prior to entering crusher 4, described above. As a further alternative instead of grinding the HDRI in crusher 4, the HDRI fines could be added in parallel, as further explained below.

Figure 2:
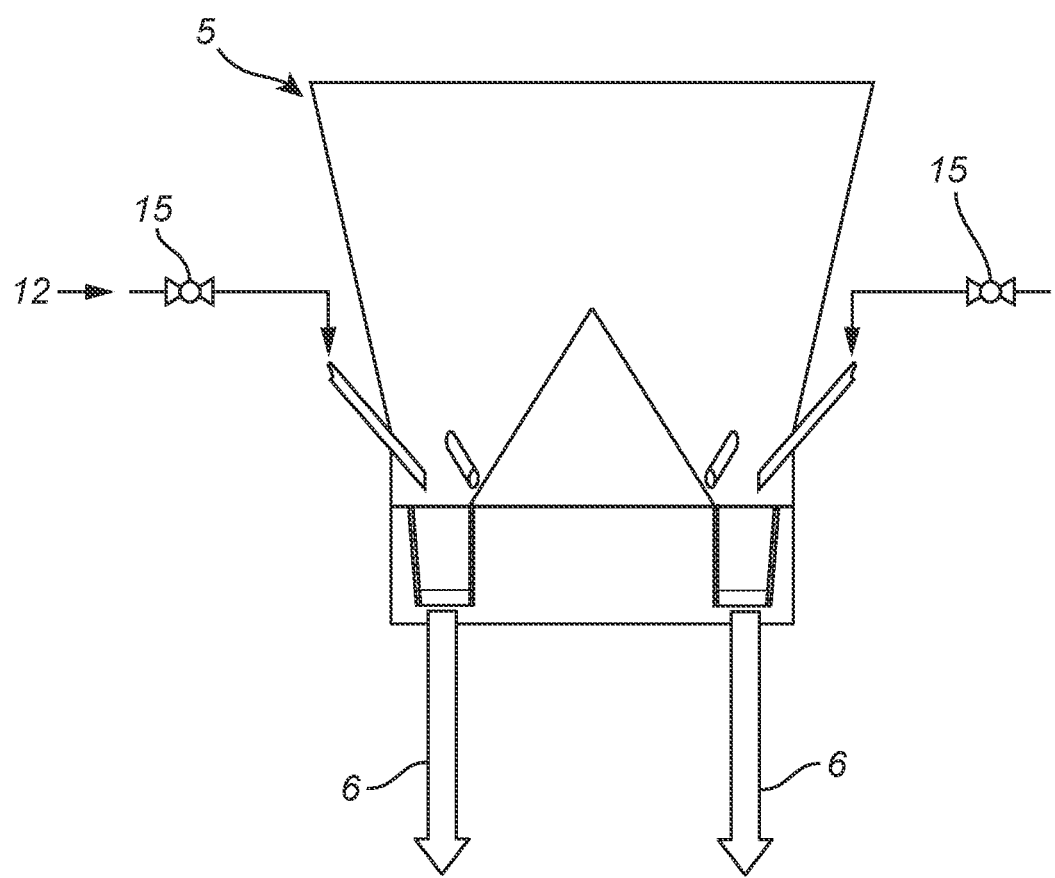
FIG. 2 is a schematic diagram illustrating an embodiment of the novel system and method of adding carbon and/or flux at a HPD (hot product distributor) in a HBI production plant, according to the present disclosure.
Figure 3:
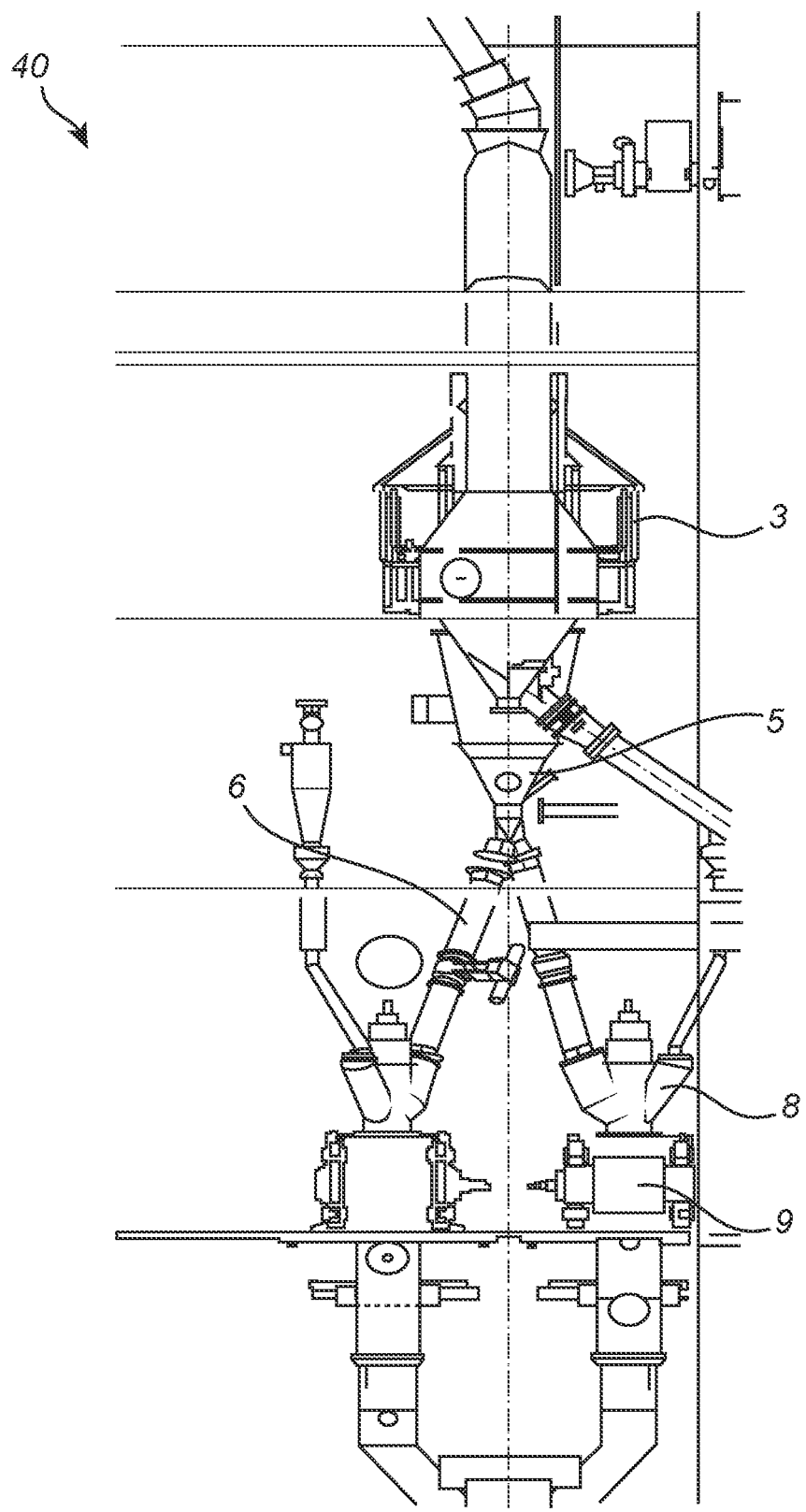
FIG. 3 is a schematic diagram illustrating an embodiment of the novel system and method of adding carbon and/or flux at a HPD (hot product distributor) in a HBI production plant showing the elevation arrangement of HPD shown by FIG. 2, according to the present disclosure.

Referring now to FIGS. 2 and 3, FIG. 2 is a schematic diagram illustrating an embodiment of the novel system and method of adding carbon and/or flux at a HPD (hot product distributor) in a HBI production plant, according to the present disclosure. Similarly, FIG. 3 is a schematic diagram illustrating an embodiment of the novel system 40 and method of adding carbon and/or flux at a HPD (hot product distributor) in a HBI production plant showing the elevation arrangement of HPD shown in FIG. 2, according to the present disclosure. More particularly, in one exemplary embodiment and best seen in FIG. 2, the carbon and flux preliminarily prepared by carbon/flux preparation system 12 can be fed into a lower section of HPD 5 to mix with the HDRI discharged from the shaft furnace 1. As best seen in FIG. 3, the carbon and flux will be further mixed with HDRI as it flows to each HB machine 9 through briquette feed leg 6 and briquette feed screw 8. Thus, in this embodiment, even in the case that the afore-described HBI fines recycle system 22 of FIG. 1 is not applied, the carbon and flux can be added at the HPD 5.

It is noted that the number of the feed points is the same as the number of briquette feed legs 6 where, in case the precise control of the feed ratio for each HB machine 9 is desired, the feed ratio of the carbon and flux to each feed point can be controlled with an independent feed system such as screw feeder or rotary valve dedicated for each feed point, cascading the output of each HB machine 9. Or, in the case in which the precise feed rate control for each HB machine 9 is not required, the total feed rate of carbon and/or flux can be controlled in the carbon/flux preparation system 12. Feeding of carbon and/or flux to the specific briquette feed leg 6 can be stopped with carbon/flux isolation valve 15 when the specific HB machine 9 is idling.

As an option, after the carbon and/or flux is fed at the HPD 5, briquette feed leg preheater 7, similar to that shown in FIG. 1, may be installed at each briquette feed leg 6 underneath the HPD 5 to make up any desired temperature of the feed mix to the HB machine 9.

Figure 4:
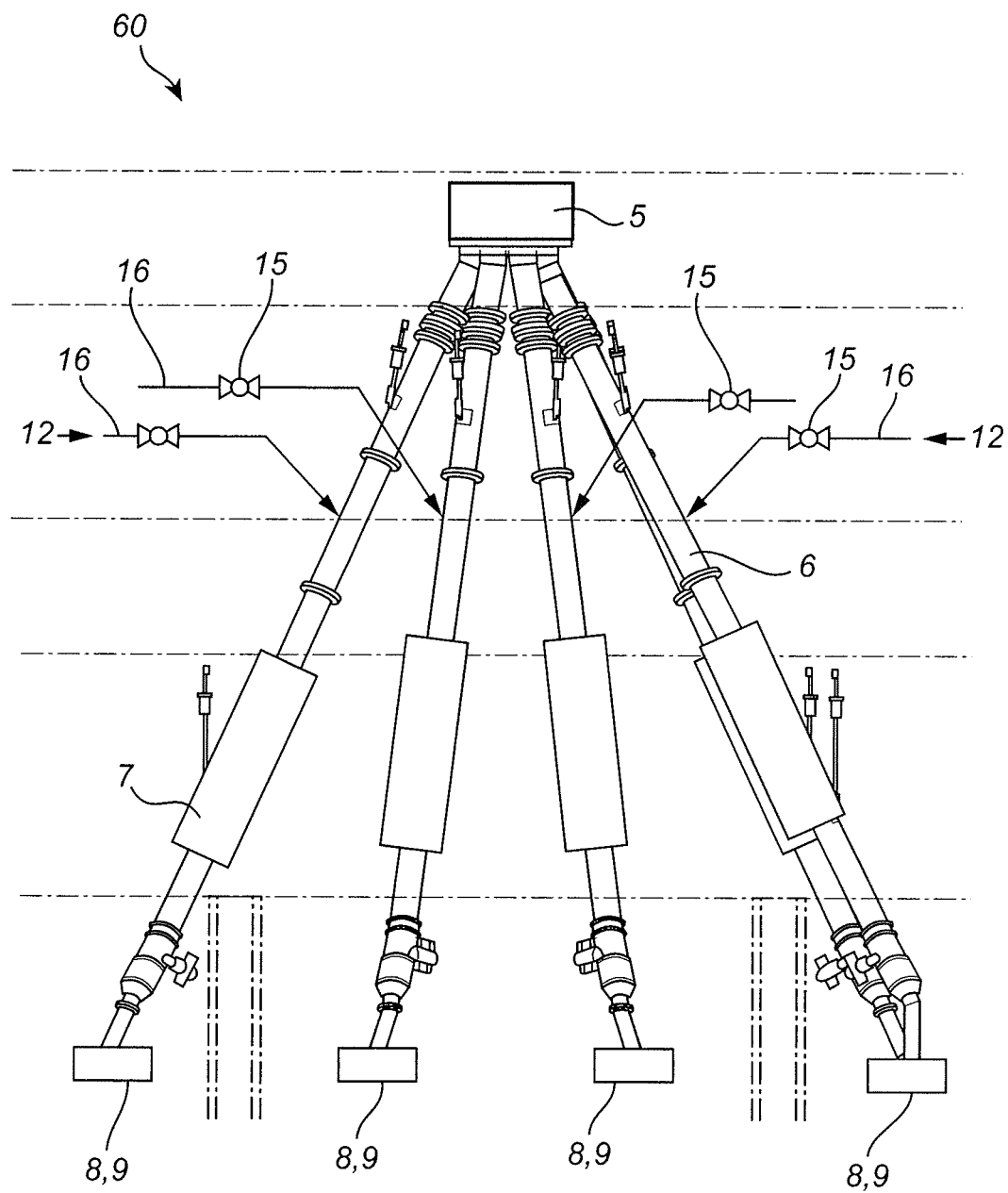
FIG. 4 is a schematic diagram illustrating an embodiment of the novel system and method of adding carbon and/or flux at a HB machine feed leg in a HBI production plant, according to the present disclosure.

Referring now to FIG. 4, FIG. 4 is a schematic diagram illustrating an embodiment of the novel system and method of adding carbon and/or flux at a HB machine feed leg 6 in a HBI production plant, according to the present disclosure.

FIG. 4 also illustrates an exemplary layout 60 for the HB machine feed legs 6 at a HBI plant. As shown therein, in one exemplary embodiment, the carbon and flux preliminarily to be prepared by carbon/flux preparation system 12 are fed at through the feed pipe 16 into each briquette feed leg 6. The carbon and flux will be further mixed with HDRI as it flows to each HB machine 9 through briquette feed screw 8.

It is noted that the number of the feed points is the same as the number of briquette feed legs 6 where, in the case where the precise control of the feed ratio for each HB machine 9 is needed, the feed ratio of the carbon and flux to each feed point can be controlled with an independent feed system such as screw feeder or rotary valve dedicated for each feed point, cascading the output of each HB machine 9. Or, in case the precise feed rate control for each HB machine 9 is not required, the total feed rate of carbon and/or flux can be controlled in carbon/flux preparation system 12. Feeding of carbon and/or flux to the specific briquette feed leg 6 can be stopped with carbon/flux isolation valve 15 when the specific HB machine 9 is idling. As an option, and as noted above, after the carbon and/or flux is fed at the HPD 5 in FIGS. 2 and 3 or at briquette feed leg 6 in FIG. 4, briquette feed leg preheater 7 may be installed at each briquette feed leg 6 underneath the HPD 5 to make up any desired temperature of the feed mix to the HB machine 9.

Figure 5:
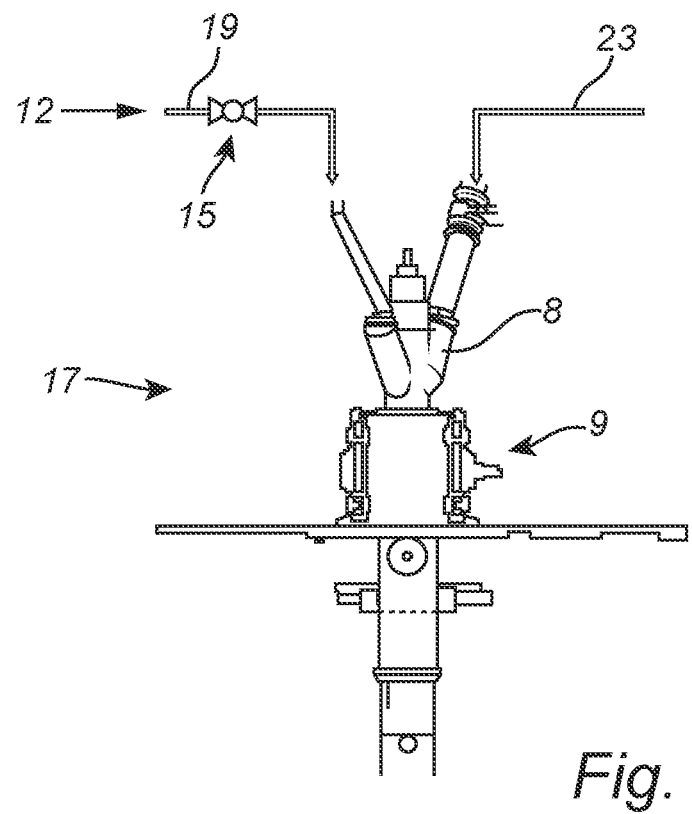
FIG. 5 is a schematic diagram illustrating an embodiment of the novel system and method of adding carbon and/or flux at a HB machine feed system in a HBI production plant, according to the present disclosure.

Referring now to FIG. 5, FIG. 5 is a schematic diagram of the elevation arrangement illustrating an embodiment of the novel system and method of adding carbon and/or flux at a HB machine feed system in a HBI production plant, according to the present disclosure. Similarly, FIG. 6 is a schematic diagram illustrating an embodiment of the novel system and method of adding carbon and/or flux at a HB machine feed system in a HBI production plant showing only briquette feed screw 8 and HB machine 9 of FIG. 5, according to the present disclosure.

Figure 6:
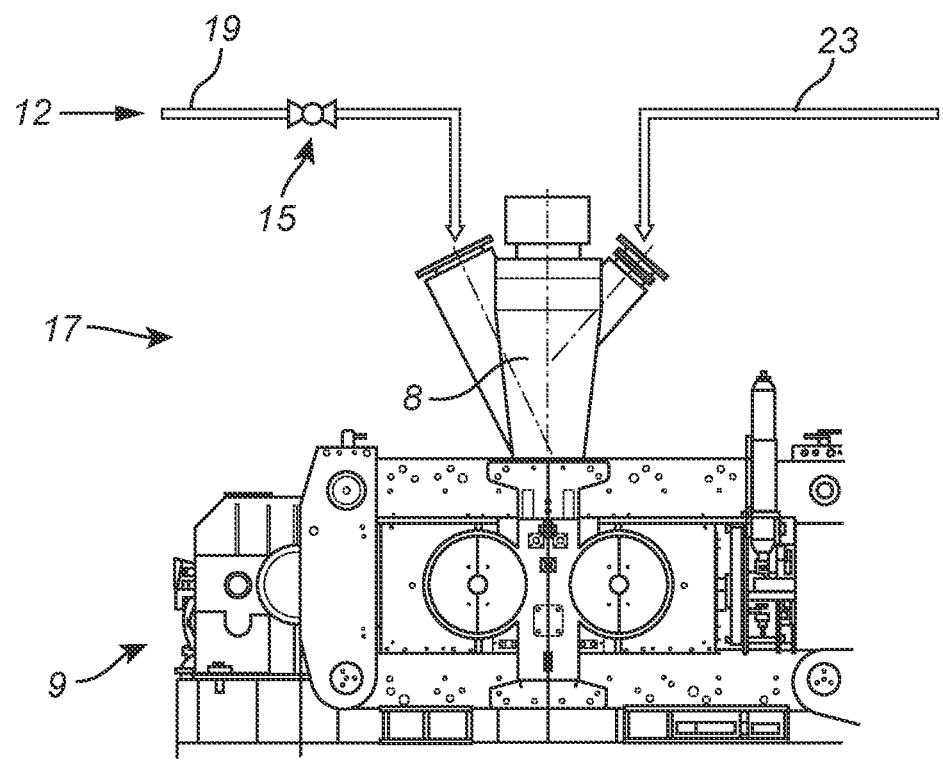
FIG. 6 is a schematic diagram illustrating an embodiment of the novel system and method of adding carbon and/or flux at a HB machine feed system in a HBI production plant showing further details of FIG. 5, according to the present disclosure.

FIGS. 5 and 6 also particularly illustrate HB machine feed system 17 therein. In one exemplary embodiment, the carbon and flux preliminarily to be prepared by carbon/flux preparation system 12 are fed through the feed pipe 19 into the briquette feed screw 8 for each HB machine 9 through a chute or feed screw thereof, simultaneously with the HDRI fed through briquette feed leg 6 (shown at 23). Thus, HDRI flow 23 transferred from the shaft furnace 1 through the briquette feed leg 6, and the carbon and flux will be further mixed with HDRI with the briquette feed screw 8.

Again, the number of the feed points is same as the number of briquette feed screws 8 where, in case precise control of the feed ratio for each HB machine 9 is needed, the feed ratio of the carbon and flux to each feed point can be controlled with an independent feed system such as screw feeder or rotary valve dedicated for each feed point, cascading the output of each HB machine 9. Or, in case the precise feed rate control for each HB machine 9 is not required, the total feed rate of carbon and/or flux can be controlled in the carbon/flux preparation system 12. Feeding of carbon and/or flux to the specific briquette feed screw 8 can be stopped with carbon/flux isolation valve 15 when the specific HB machine 9 is idling.

As an option, the carbon and/or flux fed into the briquette feed screw 8 can be preheated with an electric resistance heating system installed at carbon/flux preparation system 12, such as preheater 7 described above, before mixing with the HDRI in the briquette feed screw 8.

Figure 7:
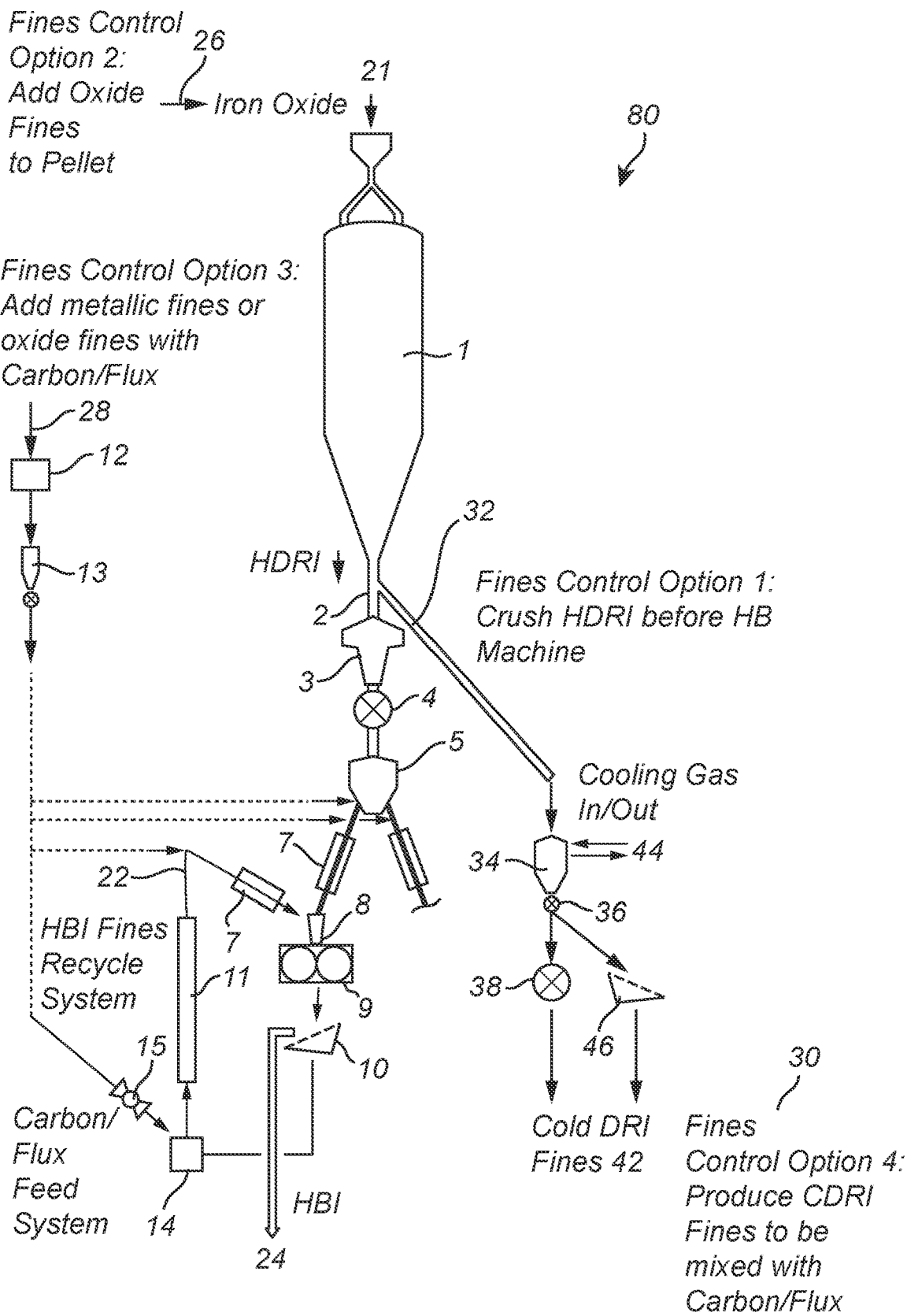
FIG. 7 is a schematic diagram illustrating an embodiment of the novel system and method of adding carbon and/or flux, including options to maintain the fraction of HDRI fines to improve HDRI strength, according to the present disclosure.

Referring now to FIG. 7, FIG. 7 is a schematic diagram illustrating an embodiment of the novel system and method 80 of adding carbon and/or flux, including options to maintain the fraction of HDRI fines to improve HDRI strength, according to the present disclosure. As noted above, the HBI strength can be improved by increasing the fines fraction of the HDRI before feeding to the HB machine 9. FIG. 7 schematically illustrates several options to increase or optimize the fines fraction of HDRI, which are further detailed below.

Option 1; As also shown in FIG. 1, HDRI crusher 4 can be installed between shaft furnace 1 and HB machine 9 to maintain enough or sufficient fines fraction to obtain the strong HBI. However, crushing the high temperature DRI may be technically complicated.

Option 2; As shown at 26 in FIG. 7, oxide fines may be mixed with the iron oxide pellets 21 in any suitable/effective amount before feeding to the shaft furnace 1. This is effective with a minor amount of fines addition, however, it is noted that too much fines addition to the oxide can cause, e.g., unstable solid material flow and non-uniform gas distribution through the material in shaft furnace 1. Therefore, the allowable amount of the oxide fines addition may be limited. Especially, it may be challenging to maintain the HDRI fines fraction higher than 5 wt. % only with the oxide fines addition.

Option 3; This option is illustrated at metallic fines or oxide fines with carbon/flux 28 in FIG. 7. If metallic fines, such as metal dusts from a dust collection system for, e.g., an HDRI, HBI or DRI melting furnace, are available, the metallic fines can be mixed with carbon and/or flux in the carbon/flux preparation system 12. Thereafter, the mixture can be fed to the HBI fines or HDRI as described above with respect to FIGS. 2 to 6.

Option 4; This option is illustrated in FIG. 7 at 30. As shown therein with the HDRI discharge pipe 32, a portion of HDRI discharged from shaft furnace 1 can be diverted to a DRI cooler 34. Cooling gas flow in/out 44 is also illustrated for this option to employed as desired. The cooled DRI may then be discharged by a cold direct reduced iron (CDRI) discharge flow control device 36 and processed by a CDRI crusher 38 or screen 46 to produce the CDRI fines 42. Instead of crushing HDRI shown as Option 1, it may be desired to produce the CDRI fines by such a cold system. The cold DRI fines can then be mixed with carbon and/or flux in carbon/flux preparation system 12. Thereafter, the mixture can be fed to HBI fines or HDRI as described above with respect to FIGS. 2 to 6. It is further noted that in the case of cold fines being fed to the HDRI before the HB machine 9, such as in Options 3 and 4 noted above for instance, it is preferable to make up more sensible heat with briquette feed leg preheater 7, to maintain the briquetting temperature typically >650° C. at the HB machine 9.

Thus, in view of the foregoing, disclosed herein are systems and methods wherein, advantageously, solid carbonaceous and/or flux material can be added to HDRI between discharging from the shaft furnace and charging to a hot briquette (HB) machine to produce the HBI for, e.g., an external off-taker, or the downstream melter to produce liquid steel or hot metal and so forth.

Accordingly, in an illustrative embodiment, a process for producing hot briquetted iron with increased solid carbonaceous material and/or flux comprises: providing a shaft furnace of a direct reduction plant to reduce iron oxide with reducing gas; providing a hot briquette machine to produce hot briquetted iron; coupling a chute between a) a discharge exit of the shaft furnace for discharge of hot direct reduced iron and b) an entrance of the hot briquette machine; adding solid carbonaceous material and/or flux to the discharged hot direct reduced iron from the shaft furnace to produce a mixture of the discharged hot direct reduced iron and the solid carbonaceous material and/or flux before feeding to the hot briquette machine; and processing in the hot briquette machine to produce a product of hot briquetted iron with increased solid carbonaceous material content of greater than 3 weight percent and/or an increased flux content.

The process may also comprise, one or more of the following, in any combination:
 i) coupling a hot briquetted iron fines recycle system, comprising hot briquetted iron fines, between the entrance and an exit of the hot briquette machine; wherein the solid carbonaceous material and/or flux is added to the hot briquette fines in a recycle loop of the recycle system for the processing in the hot briquette machine;
 ii) coupling a hot product distributor between an exit of the chute and the entrance of the hot briquette machine; adding the solid carbonaceous material and/or flux to the hot product distributor to combine with the discharged hot direct reduced iron from the shaft furnace and the solid carbonaceous material and/or flux before feeding to the hot briquette machine through a briquette feed leg coupled between the hot briquette machine and the hot product distributor;
 iv) coupling a hot product distributor between an exit of the chute and the entrance of the hot briquette machine; coupling a briquette fed leg and a briquette feed screw between the hot briquette machine and the hot product distributor; wherein the solid carbonaceous material and/or flux is added to the discharged hot direct reduced iron in the briquette feed leg of the hot briquette machine which is further mixed at the briquette feed screw before entering the hot briquette machine for agglomerating processing;
 v) wherein the solid carbonaceous material and/or flux and the discharged hot direct reduced iron are added to a briquette feed screw coupled to the hot briquette machine;
 vi) providing the hot direct reduced iron to the hot briquette machine in a fine fraction of less than 6 mm fines; and at more than 5 weight percent or more than 10 weight percent;
 vii) crushing the hot direct reduced iron to increase the fraction of the fines before feeding to the hot briquette machine;
 viii) providing the carbonaceous material and/or flux in a fines fraction of less than 200 mm (micron) fines; and at less than 20 weight percent or less than 10 weight percent;
 ix) screening the carbonaceous material and/or flux to decrease the fraction of fines before mixing with the hot direct reduced iron;
 x) mixing the carbonaceous material and/or flux with water or a binder to make an agglomeration and decrease the fraction of fines before mixing with the hot direct reduced iron;
 xi) preheating with a preheater at least one of 1) the hot direct reduced iron and 2) the carbonaceous material and/or flux;
 xii) wherein oxide fines and iron oxide pellets are mixed before feeding to the shaft furnace, to increase the fine fraction of less than 6 mm fines in the hot direct reduced iron fed to the hot briquette machine;
 xiii) wherein metallic fines are mixed with the carbonaceous and/or flux material, and thereafter combined with hot briquette fines or hot direct reduced iron before entering the hot briquette machine to increase the fine fraction of less than 6 mm fines;

xiv) providing a direct reduced iron cooler coupled to the chute;

discharging a portion of the hot direct reduced iron to the cooler to produce cold direct reduced fines, which are subsequently either 1) crushed in a crusher and mixed with the carbonaceous and/or flux material, and thereafter combined with hot direct reduced iron or hot briquette fines before entering the hot briquette machine to increase the fine fraction of less than 6 mm fines in the hot direct reduced iron fed to the hot briquette machine; or 2) screened and mixed with the carbonaceous and/or flux material, and thereafter combined with hot direct reduced iron or hot briquette fines before entering the hot briquette machine to increase the fine fraction of less than 6 mm fines in the hot briquette iron fed to the hot briquette machine.

In another illustrative embodiment, a system for producing hot briquetted iron with increased solid carbonaceous material and/or flux comprises: a shaft furnace of a direct reduction plant configured to reduce iron oxide with reducing gas; a hot briquette machine configured to produce hot briquetted iron; a chute coupled between a) a discharge exit of the shaft furnace for discharge of hot direct reduced iron and b) an entrance of the hot briquette machine; and solid carbonaceous material and/or flux configured to be added to the discharged hot direct reduced iron from the shaft furnace to produce a mixture of the discharged hot direct reduced iron and the solid carbonaceous material and/or flux before feeding to the hot briquette machine. The mixture is configured to be processed in the hot briquette machine to produce a product of hot briquetted iron with increased solid carbonaceous material content of greater than about 3 weight percent and/or an increased flux content.

The system may also comprise, one or more of the following, in any combination:

i) a hot briquetted iron fines recycle system, comprising hot briquetted iron fines, coupled between the entrance and an exit of the hot briquette machine; wherein the solid carbonaceous material and/or flux is configured to be added to the hot briquette fines in a recycle loop of the recycle system for the processing in the hot briquette machine;

ii) a hot product distributor between an exit of the chute and the entrance of the hot briquette machine;
wherein the solid carbonaceous material and/or flux is configured to be added to the hot product distributor to combine with the discharged hot direct reduced iron from the shaft and the solid carbonaceous material and/or flux before feeding to the hot briquette machine through a briquette feed leg coupled between the hot briquette machine and the hot product distributor;

iii) a hot product distributor coupled between an exit of the chute and the entrance of the hot briquette machine;
a briquette fed leg and a briquette feed screw coupled between the hot briquette machine and the hot product distributor;
wherein the solid carbonaceous material and/or flux is configured to be added to the discharged hot direct reduced iron in the briquette feed leg of the hot briquette machine which is configured to be further mixed at the briquette feed screw before entering the hot briquette machine for the agglomerating processing;

iv) wherein the solid carbonaceous material and/or flux and the discharged hot direct reduced iron are configured to be added to a briquette feed screw coupled to the hot briquette machine;

v) wherein the hot direct reduced iron is configured to be provided to the hot briquette machine in a fine fraction of less than 6 mm fines; and at more than 5 weight percent or more than 10 weight percent;

vi) a crusher configured to crush the hot direct reduced iron to increase the fraction of the fines before feeding to the hot briquette machine;

vii) wherein the carbonaceous material and/or flux has a fines fraction of less than 200 mm (micron) fines; and at less than 20 weight percent or less than 10 weight percent;

viii) a screening device configured to screen the carbonaceous material and/or flux to decrease the fraction of fines before mixing with the hot direct reduced iron;

ix) a preheater configured to preheat at least one of 1) the hot direct reduced iron and 2) the carbonaceous material and/or flux;

x) wherein the preheater is an electric heater installed at a briquette feed leg coupled to the hot briquette machine;

xi) a preheater configured to preheat the hot briquette fines after mixing the carbonaceous material and/or flux in the recycle loop or the carbonaceous material and/or flux before adding to the recycled hot briquette fines;

xii) a carbonaceous material and/or flux preparation, storage and feed system to produce the carbonaceous material and/or flux added to the hot briquette fines in the recycle system;

xiii) a mixing device with at least one of an agitator or paddle to mix the carbonaceous material and/or flux with the hot briquette iron recycled fines;

xiv) a direct reduced iron cooler coupled to the chute;
a crusher or a screen coupled to the direct reduced iron cooler;
wherein a portion the discharged hot direct reduced iron is configured to be diverted to the direct reduced iron cooler to produce cold direct reduced fines configured to be subsequently either 1) crushed in the crusher and mixed with the carbonaceous and/or flux material, and thereafter combined with hot direct reduced iron or hot briquette fines before entering the hot briquette machine to increase the fine fraction of less than 6 mm fines in the hot briquette iron configured to be fed to the hot briquette machine; or 2) screened in the screen and mixed with the carbonaceous and/or flux material; and thereafter combined with hot direct reduced iron or hot briquette fines before entering the hot briquette machine to increase the fine fraction of less than 6 mm fines in the hot briquette iron configured to be fed to the hot briquette machine.

Although the present invention is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are contemplated thereby, and are intended to be covered by the following claims. Additionally, all elements and features described herein may be used in any combination in embodiments.

What is claimed is:

1. A process for producing hot briquetted iron with increased solid carbonaceous material and/or flux comprising:
   providing a shaft furnace of a direct reduction plant to reduce iron oxide with reducing gas;
   providing a hot briquette machine to produce hot briquetted iron;
   coupling a chute between a) a discharge exit of the shaft furnace for discharge of hot direct reduced iron and b) an entrance of the hot briquette machine;
   adding solid carbonaceous material and/or flux to the discharged hot direct reduced iron from the shaft furnace to produce a mixture of the discharged hot direct reduced iron and the solid carbonaceous material and/or flux before feeding to the hot briquette machine;
   processing in the hot briquette machine to produce a product of hot briquetted iron with increased solid carbonaceous material content greater than 3 weight percent and/or an increased flux content to achieve the slag basicity (C/S) required for DRI melting process; and
   preheating with a preheater at least one of 1) the hot direct reduced iron and 2) the carbonaceous material and/or flux.

2. The process of claim 1, further comprising:
   coupling a hot briquetted iron fines recycle system, comprising hot briquetted iron fines, between the entrance and an exit of the hot briquette machine; wherein the solid carbonaceous material and/or flux is added to the hot briquetted iron fines in a recycle loop of the recycle system for the processing in the hot briquette machine.

3. The process of claim 1, further comprising:
   coupling a hot product distributor between an exit of the chute and the entrance of the hot briquette machine;
   adding the solid carbonaceous material and/or flux to the hot product distributor to combine with the discharged hot direct reduced iron from the shaft furnace before feeding to the hot briquette machine through a briquette feed leg coupled between the hot briquette machine and the hot product distributor.

4. The process of claim 1, further comprising:
   coupling a hot product distributor between an exit of the chute and the entrance of the hot briquette machine;
   coupling a briquette feed leg and a briquette feed screw between the hot briquette machine and the hot product distributor;
   wherein the solid carbonaceous material and/or flux is added to the discharged hot direct reduced iron in the briquette feed leg which is further mixed at the briquette feed screw before entering the hot briquette machine for agglomerating processing.

5. The process of claim 1,
   wherein the solid carbonaceous material and/or flux and the discharged hot direct reduced iron are added to a briquette feed screw coupled to the hot briquette machine.

6. The process of claim 1, comprising providing the hot direct reduced iron to the hot briquette machine in a fines fraction of less than 6 mm fines; and the fines fraction at more than 5 weight percent of the hot direct reduced iron.

7. The process of claim 6, further comprising crushing the hot direct reduced iron to increase the fraction of the fines before feeding to the hot briquette machine.

8. The process of claim 1, further comprising providing the carbonaceous material and/or flux in a fines fraction of less than 200 mm fines; and the fines fraction at less than 20 weight percent of the solid carbonaceous material and/or flux.

9. The process of claim 8, further comprising screening the carbonaceous material and/or flux to decrease the fraction of fines before mixing with the hot direct reduced iron.

10. The process of claim 8, comprising mixing the carbonaceous material and/or flux with water or a binder to make an agglomeration and decrease the fraction of fines before mixing with the hot direct reduced iron.

11. The process of claim 6, wherein oxide fines and iron oxide pellets are mixed before feeding to the shaft furnace, to increase the fines fraction of less than 6 mm fines in the hot direct reduced iron fed to the hot briquette machine.

12. The process of claim 6, wherein metallic fines are mixed with the carbonaceous and/or flux material, and thereafter combined with hot briquette fines or hot direct reduced iron before entering the hot briquette machine to increase the fines fraction of less than 6 mm fines.

13. The process of claim 6, comprising: providing a direct reduced iron cooler coupled to the chute; discharging a portion of the hot direct reduced iron to the cooler to produce cold direct reduced fines, which are subsequently either 1) crushed in a crusher and mixed with the carbonaceous and/or flux material, and thereafter combined with hot direct reduced iron or hot briquette fines before entering the hot briquette machine to increase the fines fraction of less than 6 mm fines in the hot direct reduced iron fed to the hot briquette machine; or 2) screened and mixed with the carbonaceous and/or flux material, and thereafter combined with hot direct reduced iron or hot briquette fines before entering the hot briquette machine to increase the fines fraction of less than 6 mm fines fed to the hot briquette machine.

14. A system for producing hot briquetted iron with increased solid carbonaceous material and/or flux comprising:
   a shaft furnace of a direct reduction plant configured to reduce iron oxide with reducing gas;
   a hot briquette machine configured to produce hot briquetted iron;
   a chute coupled between a) a discharge exit of the shaft furnace for discharge of hot direct reduced iron and b) an entrance of the hot briquette machine;
   solid carbonaceous material and/or flux configured to be added to the discharged hot direct reduced iron from the shaft furnace to produce a mixture of the discharged hot direct reduced iron and the solid carbonaceous material and/or flux before feeding to the hot briquette machine;
   a preheater configured to preheat at least one of 1) the hot direct reduced iron and 2) the carbonaceous material and/or flux; and
   wherein the mixture is configured to be processed in the hot briquette machine to produce a product of hot briquetted iron with increased solid carbonaceous material content greater than 3 weight percent and/or an increased flux content to achieve the slag basicity (C/S) required for DRI melting process.

15. The system of claim 14, further comprising:
   a hot briquetted iron fines recycle system, comprising hot briquetted iron fines, coupled between the entrance and an exit of the hot briquette machine; wherein the solid carbonaceous material and/or flux is configured to be added to the hot briquetted iron fines in a recycle loop of the recycle system for the processing in the hot briquette machine.

16. The system of claim 14, further comprising: a hot product distributor between an exit of the chute and the entrance of the hot briquette machine; wherein the solid carbonaceous material and/or flux is configured to be added to the hot product distributor to combine with the discharged hot direct reduced iron from the shaft furnace before feeding to the hot briquette machine through a briquette feed leg coupled between the hot briquette machine and the product distributor.

17. The system of claim 14, further comprising:
a hot product distributor coupled between an exit of the chute and the entrance of the hot briquette machine;
a briquette feed leg and a briquette feed screw coupled between the hot briquette machine and the hot product distributor;
wherein the solid carbonaceous material and/or flux is configured to be added to the discharged hot direct reduced iron in the briquette feed leg which is configured to be further mixed at the briquette feed screw before entering the hot briquette machine for the agglomerating processing.

18. The system of claim 14,
wherein the solid carbonaceous material and/or flux and the discharged hot direct reduced iron are configured to be added to a briquette feed screw coupled to the hot briquette machine.

19. The system of claim 14, wherein the hot direct reduced iron is configured to be provided to the hot briquette machine in a fines fraction of less than 6 mm fines; and the fines fraction at more than 5 weight percent of the hot direct reduced iron.

20. The system of claim 19, further comprising a crusher configured to crush the hot direct reduced iron to increase the fraction of the fines before feeding to the hot briquette machine.

21. The system of claim 14, wherein the carbonaceous material and/or flux has a fines fraction of less than 200 mm fines; and the fines fraction at less than 20 weight percent of the solid carbonaceous material and/or flux.

22. The system of claim 21, further comprising a screening device configured to screen the carbonaceous material and/or flux to decrease the fraction of fines before mixing with the hot direct reduced iron.

23. The system of claim 14, wherein the preheater is an electric heater installed at a briquette feed leg coupled to the hot briquette machine.

24. The system of claim 15, further comprising a preheater configured to preheat the hot briquetted iron fines after mixing the carbonaceous material and/or flux in the recycle loop or the carbonaceous material and/or flux before adding to the recycled hot briquette fines.

25. The system of claim 15, further comprising a carbonaceous material and/or flux preparation, storage and feed system to produce the carbonaceous material and/or flux added to the hot briquetted iron fines in the recycle system.

26. The system of claim 25 further comprising a mixing device with at least one of an agitator or paddle to mix the carbonaceous material and/or flux with the hot briquetted iron fines in the recycle system.

27. The system of claim 14 further comprising: a direct reduced iron cooler coupled to the chute; a crusher or a screen coupled to the direct reduced iron cooler; wherein a portion of the discharged hot direct reduced iron is configured to be diverted to the direct reduced iron cooler to produce cold direct reduced fines configured to be subsequently either 1) crushed in the crusher and mixed with the carbonaceous and/or flux material, and thereafter combined with hot direct reduced iron or hot briquette fines before entering the hot briquette machine to increase the fines fraction of less than 6 mm fines configured to be fed to the hot briquette machine; or 2) screened in the screen and mixed with the carbonaceous and/or flux material; and thereafter combined with hot direct reduced iron or hot briquette fines before entering the hot briquette machine to increase the fines fraction of less than 6 mm fines configured to be fed to the hot briquette machine.

28. The system of claim 19, further comprising the fines fraction at more than 10 weight percent of the hot direct reduced iron.

29. The system of claim 21, further comprising the fines fraction at less than 10 weight percent of the solid carbonaceous material and/or flux.

30. The process of claim 6, further comprising the fines fraction at more than 10 weight percent of the hot direct reduced iron.

31. The process of claim 8, further comprising the fines fraction at less than 10 weight percent of the solid carbonaceous material and/or flux.

* * * * *